United States Patent [19]

Maurer

[11] 4,161,674

[45] Jul. 17, 1979

[54] OVERVOLTAGE PROTECTED FLUORESCENT TUBE SUPPLY CIRCUIT

[76] Inventor: Paul Maurer, CH-8902 Urdorf, Switzerland

[21] Appl. No.: 872,920

[22] Filed: Jan. 27, 1978

[30] Foreign Application Priority Data

Feb. 3, 1977 [CH] Switzerland .................. 1224/77

[51] Int. Cl.$^2$ .............. H05B 37/00; H05B 41/14
[52] U.S. Cl. ........................ 315/86; 315/DIG. 5;
315/175; 315/222; 307/66; 361/112
[58] Field of Search ............. 315/87, 86, 175, 222,
315/225, DIG. 5, DIG. 7; 307/200 A, 66;
361/112

[56] References Cited

U.S. PATENT DOCUMENTS

| | | | |
|---|---|---|---|
| 3,351,770 | 11/1967 | O'Sullivan et al. | 307/200 A |
| 3,754,160 | 8/1973 | Jensen | 315/DIG. 7 |
| 3,869,639 | 3/1975 | Herzog | 315/86 |
| 3,889,153 | 6/1975 | Pierce | 315/DIG. 5 |
| 3,906,243 | 9/1975 | Herzog | 315/86 |
| 4,005,335 | 1/1977 | Perper | 315/DIG. 7 |
| 4,029,993 | 6/1977 | Alley et al. | 315/DIG. 5 |

Primary Examiner—Saxfield Chatmon, Jr.
Attorney, Agent, or Firm—Frishauf, Holtz, Goodman & Woodward

[57] ABSTRACT

To prevent excessive voltages from interfering with a switching transistor supplying a fluorescent tube circuit with alternating pulses from a d-c supply upon removal of the fluorescent tube from the tube transformer, a voltage detector is connected to the primary or input winding of the fluorescent tube transformer to determine occurrence of excessive voltages upon removal of the tube from the secondary, the sensed excessive voltage being applied to a switching circuit to remove the transformer from the supply. The system is particularly applicable to emergency supply connections in which the tubes are, normally, supplied from an alternating current network and from a transistor inverter and a battery under conditions of network power failures.

9 Claims, 1 Drawing Figure

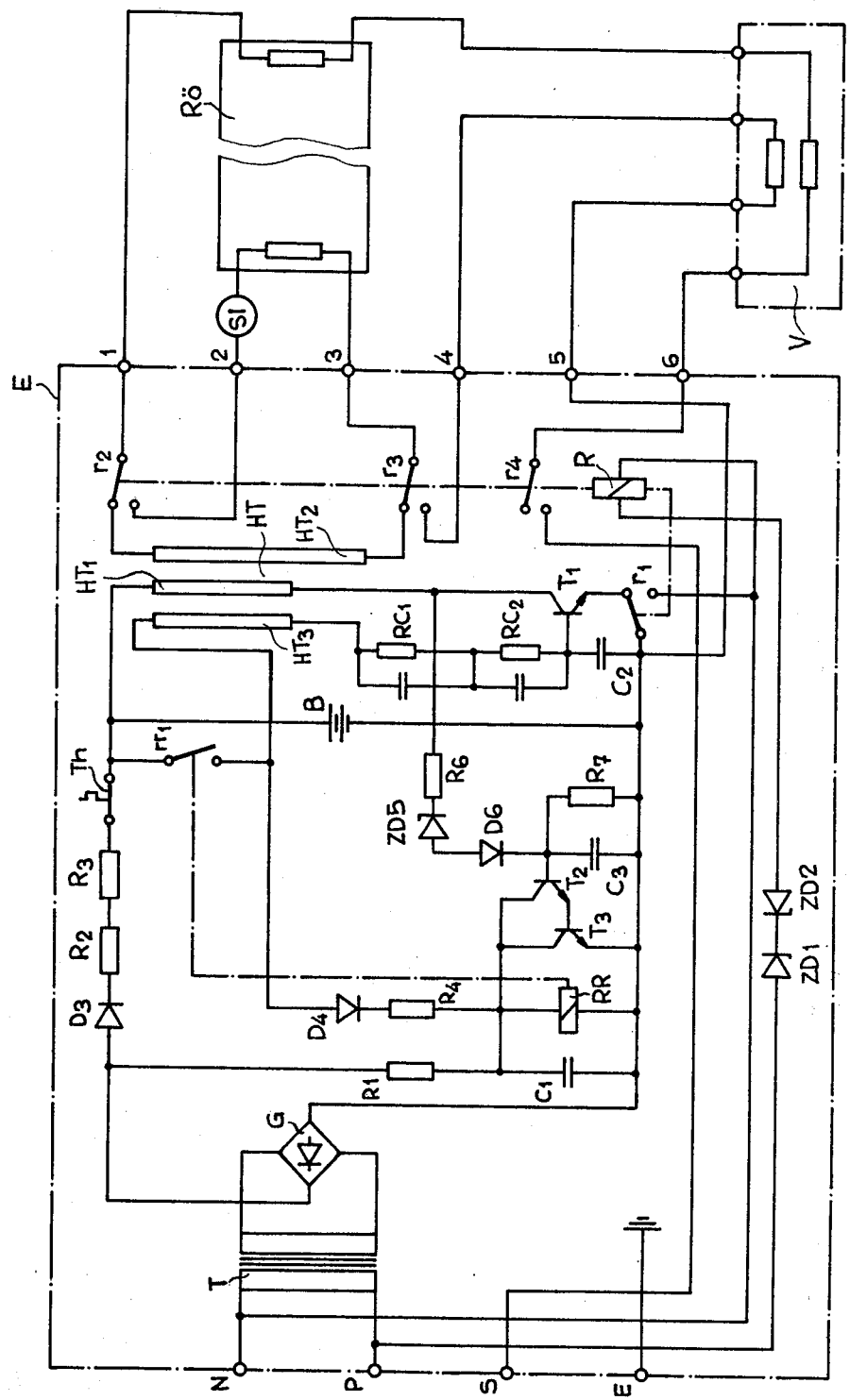

OVERVOLTAGE PROTECTED FLUORESCENT TUBE SUPPLY CIRCUIT

The present invention relates to a supply circuit for fluorescent tubes, and more particularly to protect an inverter circuit connected to the fluorescent tube against excessive voltages.

BACKGROUND AND PRIOR ART

Various types of fluorescent tube circuits have been proposed. Normally, fluorescent tubes are supplied from an alternating current network. In many installations, however, for example in department stores or other public places in which fluorescent tubes are used for general illumination, it is necessary that emergency circuits are provided in case of failure of network power supply. Such emergency circuits usually include a battery, connected through a rectifier to the network, and an inverter circuit which is activated upon failure of network power to then supply the fluorescent tube lighting circuit with alternating voltage pulses.

THE INVENTION

It has been found that removal of the fluorescent tube from the circuit still continues discharge of the emergency supply battery and, additionally, may lead to damage or destruction of semiconductor elements in the inverter circuit, particularly switching transistors.

It is an object to provide a circuit in which discharge of a supply battery is inhibited, and currents of dangerous voltage prevented even if the fluorescent tube of a fluorescent tube circuit is removed.

Briefly, in accordance with the invention, a voltage detector is provided connected to the primary of the fluorescent tube transformer to sense occurrence of excessive voltages which, upon sensing such voltages, then controls switching devices to disconnect the d-c power supply, for example the floating battery from an emergency power source.

Installation of an emergency power lamp, or change of a fluorescent tube of the lamp, then will not lead to the discharge of the battery, or damage to or destruction of switching transistors used in the fluorescent tube inverter circuit.

Drawing, illustrating a preferred example:

The single FIGURE is a schematic diagram of a fluorescent tube supply circuit incorporating the present invention.

The circuit is connected to terminals N, P and E of a power supply network, in which the terminal E is a ground or chassis terminal, N and P are the neutral and power buses of the network which, for example, is a 230 V network; S is a switch terminal to connect the fluorescent lamp in circuit if it is desired that the lamp should be lit. Terminal S, as is customary, would be connected through a standard switch to the terminal P.

The present invention is illustrated in combination with an emergency power supply network to connect fluorescent tube Ro in circuit with a battery B if there should be failure of power being supplied from the network N, P. To detect presence of power at the terminals P an a-c relay R is connected through Zener diodes ZD1 and ZD2 across the terminals N, P. The Zener diodes ZD1 and ZD2 are provided to permit the relay R to drop out if the line voltage drops below a predetermined lower value, and to energize the relay R if another, predetermined minimum value has been reached. The relay R thus operates with hysteresis. The switching terminals operated by the relay R are indicated as $r_1$–$r_4$.

The emergency supply battery B is charged from the power remains N, P through a transformer T and a bridge rectifier G. The battery is continuously charged over diode D3 and the resistors $R_1$, $R_2$ and over thermostatic safety switch Th provided that power is supplied to the terminals N. P. If the ambient temperature rises above a predetermined value, then thermostatic switch Th will open to prevent charging of the battery B if there is excess ambient temperature, thereby preventing damage to, or possible destruction of, the battery B. A relay RR having contacts $rr_1$ is connected over a resistor $R_1$ to the bridge G. A capacitor $C_1$ is connected in parallel to the coil of the relay RR to filter the d-c output from the rectifier G. Upon loss of voltage from the power supply, the relay RR will continue energized through a self-holding circuit: Closed switching terminals $rr_1$, diode D4, resistor R4, coil RR, and battery B. The relay RR thus is energized with power from battery B even upon failure of power from the network at terminals N, P. The contact $rr_1$ of the relay also closes the network from battery B through a feedback winding $HT_3$ of a high-voltage transformer HT for the fluorescent tube ro. The feedback winding of the fluorescent tube includes two R/C circuits $RC_1$ and $RC_2$, which are connected to the base of a switching transistor $T_1$. The switching transistor $T_1$ is blocked when the switch terminals $rr_1$ of the relay RR are open. Diode D3 is provided to prevent current flow to the relay coil RR from battery B bypassing the switch terminals $rr_1$. The self-holding circuit of the relay should be effective only if power from the power terminals N, P is disconnected; otherwise, the relay RR is energized through the rectifier G and the resistor $R_1$.

A capacitor $C_2$ is connected to the base of transistor $T_1$ to filter switching pulses arising upon change-over of state of conduction of the transistor $T_1$.

The high-voltage transformer HT has three windings: an input winding or primary winding $HT_1$, a high-voltage output or secondary winding $HT_2$, and a feedback winging $HT_3$. The primary $HT_1$ is connected in series with the emitter-collector or main switching path of the transistor $T_1$. Under conditions of operation of supply from the battery B, the switching transistor $T_1$ will alternately open and close, thus, in effect, providing a pulsed voltage to the transformer to induce a high voltage in the secondary thereof.

In accordance with the present invention, and to disconnect the battery from the supply circuit, after failure of power at the power network terminals N, P, if the tube Ro is removed, a voltage detector is provided which is connected to the primary winding $HT_1$. The voltage detector senses increased reflected primary voltage, due to self-induction, which will occur upon removal of the tube Ro. The voltage detector circuit, essentially, is formed by the resistor $R_6$, Zener diode ZD5 and diode D6. The circuit is connected to capacitor $C_3$. If the voltage on the primary winding $HT_1$ of the transformer HT increases, Zener diode ZD5 will become conductive, and a current can flow to charge capacitor $C_3$. The relay RR which, preferably, is a reed relay, has its coil shunted by a Darlington transistor pair T2, T3 which, when conductive, shortcircuit the relay RR. The transistors T2, T3 will become conductive when the voltage across capacitor $C_3$ has risen to a predetermined suitable level, sufficient to render the driver transistor T2 conductive. Resistor R7 is connected in parallel to the capacitor C3 to permit discharge of the capacitor C3.

Operation: The system can operate in three main modes, namely: (1) normal operation; (2) operation supplied by battery B, for example under emergency conditions upon failure of network power across terminals N, P; and (3) operation with battery B supplying power and fluorescent tube Ro removed.

(1) Normal network operation: If normal network power is applied to the terminals N, P, relay R will pull in and the contacts $r_1$ to $r_4$ will close, that is, they will change over from the position shown in the drawing to the other position. The battery B, which is a secondary battery, can now charge through the transformer T, rectifier G, diode D3, and resistors R2, R3, and the thermostat switch Th. If switch terminal S is connected through a switch to terminal P, and power is supplied, the tube Ro is connected to the circuit as follows: Terminal S, relay terminals $r_4$, circuit network terminal 6, ballast coil of ballast V, right filament of tube Ro, network terminal 1, relay terminals $r_2$, network terminal 2, starter SI, left filament of fluorescent tube Ro, network terminal 3, relay switch terminals $r_3$, network terminal 4, second coil of ballast V, network terminal 5, relay switch terminal $r_1$, and return to power supply terminal N. The ballast V will cause starting and firing of the tube Ro, as is well known and customary in the fluorescent tube supply field, and need not be described in detail. The network terminals 1–6 are connected to the ballast V and to the fluorescent tube Ro as shown through the relay switch terminals $r_1$ to $r_4$ which have changed over from the position shown in the drawing to the other position upon pullin of the relay coil R if the network supply voltage is sufficient. If, however, the network voltage should drop below a predetermined level, for example below 170 V in a nominal 220/230 V supply network, then Zener diodes ZD1 and ZD2 will block. Relay R will drop out, the connections will then be as shown in the drawing, and the tube Ro will operate under emergency condition supplied by battery B, mode (2).

(2) Operation supplied by battery B: If the network voltage across terminals N, P should fail, or drop below a predetermined value, for example 170 V for 220/230 V nominal supply, the relay R will drop out and the terminals thereof, $r_1$ to $r_4$, will change over to the position shown in the FIGURE. The fluorescent tube Ro will then be supplied from the battery B. To maintain operation of the fluorescent tube, and upon cold starting, a voltage of about 1000 V is necessary. The transformer HT supplies this output voltage.

In normal operation, that is, if there is supply voltage from terminals N, P, relay RR is pulled in so that its contacts $rr_1$ are closed. Under battery supply conditions, likewise, the terminals $rr_1$ are held closed by the holding circuit supplied from the battery B: B—relay contact contacts $rr_1$—diode D4—resistor R4—relay coil RR—return to battery B. To supply the fluorescent tube Ro, current can flow from the battery through the relay switch terminals $rr_1$ through the feedback winding HT3, and the R/C timing network $RC_1$, $RC_2$ to the base of transistor T1, causing transistor T1 to become conductive. This will permit current to flow through the primary HT1 of the high-voltage transformer HT and through the base-emitter path of the transistor T1. As a consequence, a voltage will be induced both in the output winding HT2 as well as in the feedback winding HT3. The voltage in feedback winding HT3 is opposed to the battery voltage B, causing the transistor T1 to block, and interrupting current flow through the primary winding HT1. The voltage in the output or secondary winding HT2 will be an induced high voltage which is applied through the main relay terminals $r_2$, $r_3$ to the electrodes of the fluorescent tube which will fire. After the induced voltage in the feedback winding HT3 decays, transistor T1 again becomes conductive, permitting current to flow again through the input of primary winding HT1 of the high-voltage transformer HT, and the cycle will repeat. The frequency of firing of the tube Ro is determined, essentially, by the R/C timing networks $RC_1$, $RC_2$. The repetition of firing of the tube should be high enough so that visible flicker is essentially avoided, the after-glow of the phosphorus in the fluorescent tube providing an essentially uniform illumination output.

(3) Operation of (2) above, with tube Ro removed: Upon removal of the fluorescent tube Ro, the initial portion of the cycle above described in connection with operating mode (2) will obtain. Since the output or secondary winding HT2 does not have the tube Ro connected thereto, however, an undesirably high voltage will occur at the primary winding HT1 which, if permitted to persist, may damage or destroy transistor T1, or gradually affect to eventually destroy the transistor. This increased voltage is sensed by the voltage detector R6, ZD5, D6, provided in accordance with the present invention. When the breakdown or Zener voltage of Zener diode ZD5 has been reached, current will flow from winding HT1 through the resistor R6, Zener diode ZD5 and diode D6 to charge the capacitor C3. When capacitor C3 has been sufficiently charged, transistors T2 and T3 will switch to conductive state, short-circuiting reed relay RR. Consequently, the switching terminal $rr_1$ will drop out, thus interrupting current supply from secondary battery B to the feedback winding HT3 of the high-voltage transformer HT, hence interrupting current flow to the R/C circuits and to the base of transistor T1. Transistor T1 will remain blocked and no further current can flow through the primary winding HT1 of the transformer HT. This protects the transistor T1 and, additionally, prevents discharge of the battery B since, effectively, the battery B has been isolated from a current-carrying circuit.

The relay RR, preferably a reed relay, will also drop out if the battery B supplies insufficient voltage to keep it in holding position. Preferably, the relay RR should be so set that it functions at a design voltage of the battery B and a slightly lower voltage, but drops out rapidly if the voltage should drop below a predetermined level. This prevents essentially complete discharge of the battery B, thus preventing damage thereto. The relay RR does not engage automatically if the battery voltage is reestablished, for example by replacing the battery with another one which has been charged. The relay RR will automatically reconnect only upon reestablishing of network power across terminals N, P. Of course, an override, manual closing button for momentary operation can be provided for relay terminals $rr_1$ to reset the relay rr into its self-holding circuit if continued emergency operation is desired, for example with a replaced, recharged battery B.

Various changes and modifications may be made within the scope of the inventive concept.

The present invention has been described in connection with a fluorescent lighting circuit operable either from an a-c power network or from the battery B, under emergency, that is, power failure conditions. The circuit is equally applicable to other networks in which the supply of the fluorescent tubes is only from a direct current source, for example by using a floating battery B. Such operation may, for example, be suitable for self-contained vehicular or other mobile operation in which a rotating power source provides power to a d-c on-board vehicular network which includes a floating battery to supply power to the network when the vehicular rotating power source is not operating and in which the fluorescent lamps are repetitively fired by high-voltage pulses. The relay R and the associated terminals $r_1$, $r_4$ as well as the ballast V can then be omitted, and the tube Ro wired directly from the network terminals 1 and 3 with fixed connections replacing the relay switching terminals $r_2$, $r_3$.

I claim:

1. Overvoltage protected fluorescent tube supply circuit to supply a fluorescent tube (Ro) from a d-c voltage source (B) and to protect the circuit upon removal of the fluorescent tube having a transformer (HT) having a secondary ($HT_2$) connected to the electrodes of the fluorescent tube (Ro);

a primary winding ($HT_1$) and a feedback winding ($HT_3$);

an oscillatory supply circuit for the transformer including a controlled semiconductor switching element ($T_1$) having a control electrode (base) and a main current carrying path (emitter-collector), said main current carrying path being connected serially between the primary winding ($HT_1$) and said voltage source (B);

and a timing circuit ($RC_1$ $RC_2$) connected to the feedback winding, to said source, and to the control electrode of said controlled switching element ($T_1$) to control, respectively, conduction, and nonconduction, in periodic oscillatory cycles, of said semiconductor switching element in accordance with induction of voltage in said feedback winding upon change of current flow through the primary winding due to change of said semiconductor switching element between conductive and nonconductive state, change of current flow through said primary winding inducing a high voltage in the secondary ($HT_2$) thereof to operate the fluorescent tube, and comprising a safety circuit to disconnect current supply from said source to said transformer upon removal of the fluorescent tube (Ro) from connection to the secondary ($HT_2$) of said transformer including a relay (RR, rr) having a control portion (RR) and normally open switching terminals (rr), the control portion of the relay being connected in series with one of the windings ($HT_3$) of the transformer (HT), and the switching terminals (rr) being connected between the voltage source (B) and said one of the windings ($HT_3$) of the transformer;

a voltage detector ($R_6$, ZD5, D6) connected to sense voltages occuring at the primary winding ($HT_1$) of the transformer upon disconnection of the tube (Ro) from the secondary ($HT_2$);

and controlled switching means ($T_2$, $T_3$) connected to and controlled by the voltage detector responsive to a sensed voltage at said primary winding in excess of a predetermined level to remove supply of power from said source (B) to said transformer (HT) comprising a transistor switch ($T_2$, $T_3$) connected to the relay to deenergize the relay when the transistor switch becomes conductive upon sensing of voltage at said primary winding in excess of said predetermined level and thus disconnecting the source (B) from the transformer.

2. Circuit according to claim 1, wherein the switching terminals (rr) of the relay are connected to said feedback winding ($HT_3$) to remove control voltages from said controlled semiconductor switching element ($T_1$) and thus place said semiconductor switching element ($T_1$) connected in series circuit with the primary winding ($HT_1$) of said high-voltage transformer in open circuit condition.

3. Circuit according to claim 1 wherein said voltage sensing means includes a Zener diode (ZD5) connected to the primary winding ($HT_1$) of the transformer (HT);

and a capacitor ($C_3$) connected to and charged by current flow through the Zener diode if the voltage at the primary winding ($HT_1$) exceeds the Zener or breakdown voltage of the Zener diode, the charge voltage across said capacitor controlling said transistor switch ($T_2$, $T_3$) upon sensing of excess voltage at the primary winding of the transformer, and accumulation of a predetermined charge voltage across said capacitor ($C_3$).

4. Circuit according to claim 1, wherein the voltage sensing means includes a Zener diode (ZD5), a diode (D6) serially connected with the Zener diode and in blocking connection with respect to the conductive connection of the Zener diode (ZD5) and a capacitor ($C_3$) connected to be charged upon breakdown of the Zener diode through said diode (D6), the Zener diode (ZD5) being connected to the primary ($HT_1$) of said transformer (HT).

5. Circuit according to claim 1, to supply the fluorescent tube with power under emergency conditions upon loss of power from an alternating power network including means (N, P, S, E) providing a source of alternating voltage, a power transformer and rectifier (T, G);

said d-c source forming a secondary battery;

connection means ($D_3$, $R_2$, $R_3$, Th) connecting the rectifier (G) to the battery to charge the battery under normal current supply conditions;

and means (ZD1, ZD2, R, $r_1$-$r_4$) selectively connecting the fluorescent tube (Ro) to the a-c network for power supply therefrom, or, upon failure of a-c power supply, from the secondary battery.

6. Circuit according to claim 1 wherein the transistor switch ($T_2$, $T_3$) is connected across the control portion (RR) of the relay and short circuits said control portion when the transistor switch becomes conductive upon sensing of the voltage at said primary winding in excess of said predetermined level.

7. Circuit according to claim 2, wherein the transistor switch ($T_2$, $T_3$) is connected across the control portion (RR) of the relay and short circuits said control portion when the transistor switch becomes conductive upon sensing of the voltage at said primary winding in excess of said predetermined level.

8. Circuit according to claim 1, wherein the relay switching terminals (rr) are connected with the source (B) in a self-holding circuit, deenergizing the control portion (RR) of said relay causing dropout of the self-holding circuit in addition to disconnection of said source (B) from the transformer (HT).

9. Circuit according to claim 1, wherein said controlled semiconductor switching element comprises a switching transistor ($T_1$) and the timing circuit connected to the feedback winding ($HT_3$) is connected to the base of the switching transistor ($T_1$).

* * * * *